US007101499B1

United States Patent
Bronicki et al.

(10) Patent No.: US 7,101,499 B1
(45) Date of Patent: Sep. 5, 2006

(54) METHOD OF AND APPARATUS FOR PRODUCING PELLETS FROM HEAVY HYDROCARBON LIQUID

(75) Inventors: Yoram Bronicki, Rehovot (IL); J. Robert Friday, Grantham, NH (US); Philip B. Rettger, Walnut Creek, CA (US)

(73) Assignee: Ormat Technologies, Inc., Sparks, NV (US)

( * ) Notice: Subject to any disclaimer, the term of this patent is extended or adjusted under 35 U.S.C. 154(b) by 474 days.

(21) Appl. No.: 09/627,166

(22) Filed: Jul. 27, 2000

(51) Int. Cl.
   *B29B 9/10* (2006.01)

(52) U.S. Cl. .............................. 264/11; 264/5; 264/13; 425/6; 425/10

(58) Field of Classification Search ............... 264/5–14; 425/6, 10
   See application file for complete search history.

(56) References Cited

U.S. PATENT DOCUMENTS 3,197,413 A * 7/1965 Wingerd
4,024,210 A * 5/1977 Chalmers ................. 264/11
4,052,492 A * 10/1977 Kontny et al. ............ 264/11
4,931,231 A * 6/1990 Teppo ...................... 264/13

OTHER PUBLICATIONS

The Condensed Chemical Dictionary, 10$^{th}$ ed.,1981, p. 92.*
"New Pelletizer Makes Higher–Value Fuel From Resid," *Oil & Gas Journal*, Apr. 17, 2000, pp. 60–61.

* cited by examiner

*Primary Examiner*—Mary Lynn Theisen
(74) *Attorney, Agent, or Firm*—Nath & Associates PLLC; Gary M. Nath; Jerald L. Meyer

(57) ABSTRACT

Apparatus for producing pellets from hot heavy hydrocarbon or asphaltene, in accordance with the present invention, includes flow means that supplies the hot heavy hydrocarbon or asphaltene through a conduit to its outlet; and pellet producing medium or means that breaks up the liquid stream of the hot asphaltene flowing out of the outlet of the conduit and produces pellets of asphaltene. Furthermore, the apparatus includes a reservoir or container that collects the pellets of heavy hydrocarbon or asphaltene together with some fluid producing a slurry; and transporting means that transports the slurry to the required location. Preferably, the fluid is liquid water. In addition, the pellet producing medium preferably is liquid water.

11 Claims, 3 Drawing Sheets

METHOD OF AND APPARATUS FOR PRODUCING PELLETS FROM HEAVY HYDROCARBON LIQUID

DESCRIPTION

1. Technical Field

This inventions relates to processing heavy hydrocarbon feeds which may be used in refineries and/or producing power, and more particularly, to a method of and apparatus for producing pellets of heavy hydrocarbon feeds such as residual oil and/or asphaltenes.

2. Background of the Invention

A typical petroleum refinery receives crude oil and primarily produces gasoline, jet fuel, diesel fuel, and heating oil. The by-products of the refinery process are light gases, and heavy, viscous residual oil sometimes referred to as vacuum residual. The light gases can be used in the refinery, or sold outside the refinery as fuel.

To store, transport, and thus dispose of the heavy residual oil, it is conventional to reduce its viscosity by mixing it with lower viscosity diluent such as diesel fuel produced by the refinery. The resultant residual fuel oil is usually sold as fuel to electric utilities.

Disposing of residual oil by blending with valuable diluent is not always cost effective; and in many refineries, solvent deasphalting processing of the residual oil is carried out to produce charge stock for catalytic cracking, or hydrocracking units, and thus to reduce the amount of less valuable by-products. Such processing involves mixing the residual oil with a light hydrocarbon solvent, such as propane, iso-butane, normal-butane, iso-pentane, normal-pentane, or mixtures of these hydrocarbons. When a light hydrocarbon solvent is mixed with the residual oil under conditions of high pressure and temperature in an equilibrium vessel, the residual oil separates into two distinct fractions; a deasphalted oil (DAO) fraction essentially free of asphaltenes, and an asphaltene fraction containing a small portion of deasphalted oil which is soluble in this fraction. By providing additional equilibrium vessels, intermediate products can be produced which are not as "clean" as the DAO, but which are "cleaner" than the asphaltenes.

Many situations require the asphaltene, that is usually quite hot (sometimes as high as about 450° F.), to be transferred or transported to another location near or in the refinery. Transporting asphaltene at such temperatures is not a simple procedure since it may need the use of costly heat insulators.

On the other hand, to solidify the asphaltene is very complicated and usually involves costly machinery. Moreover, transportation of such solidified heavy hydrocarbon material is also quite expensive and usually brings with it heavy maintenance costs.

It is therefore an object of the present invention to provide a new and improved method of and apparatus for processing heavy hydrocarbon feeds such as residual oil and/or asphaltene and producing pellets therefrom wherein the disadvantages as outlined are reduced or substantially overcome.

SUMMARY OF THE INVENTION

Apparatus for processing heavy hydrocarbons or asphaltene and producing pellets from hot heavy hydrocarbon or asphaltene, in accordance with the present invention, comprises flow means that supplies the hot heavy hydrocarbon or asphaltene through a conduit to its outlet; and pellet producing medium or means that breaks up the liquid stream of the hot asphaltene exiting the outlet of the conduit and produces pellets of asphaltene. Furthermore, the apparatus comprises a reservoir or container that collects the pellets of heavy hydrocarbon or asphaltene together with some fluid producing a slurry; and transporting means that transports the slurry to the required location. Preferably, the fluid is liquid water. In addition, the pellet producing medium preferably is liquid water.

Furthermore, the present invention provides a method that processes heavy hydrocarbons or asphaltene and produces pellets from hot heavy hydrocarbon or asphaltene, the method comprising the steps of: supplying the hot heavy hydrocarbon or asphaltene through a conduit to its outlet; and breaking up the liquid stream of hot asphaltene exiting the outlet of the conduit using a pellet producing medium to produce pellets of heavy hydrocarbon or asphaltene. The pellets of heavy hydrocarbon or asphaltene are collected in a reservoir or container together with some fluid producing a slurry; and the slurry is transported to a required location. Preferably, the step of collecting the pellets in a reservoir or container together with some fluid producing a slurry is carried out by collecting the pellets in a reservoir or container together with some liquid water producing a slurry. In addition, the step of breaking up the liquid stream of hot asphaltene flowing out of the outlet of the conduit using a pellet producing medium to produce pellets of heavy hydrocarbon or asphaltene is preferably carried out by breaking up the liquid stream of hot asphaltene flowing out of the outlet of the conduit using liquid water to produce pellets of heavy hydrocarbon or asphaltene.

BRIEF DESCRIPTION OF THE DRAWINGS

Embodiments of the present invention are described by way of example, and with reference to the accompanying drawings wherein.

Like reference numerals and designations in the various drawings refer to like elements.

DETAILED DESCRIPTION

Figure 1A:
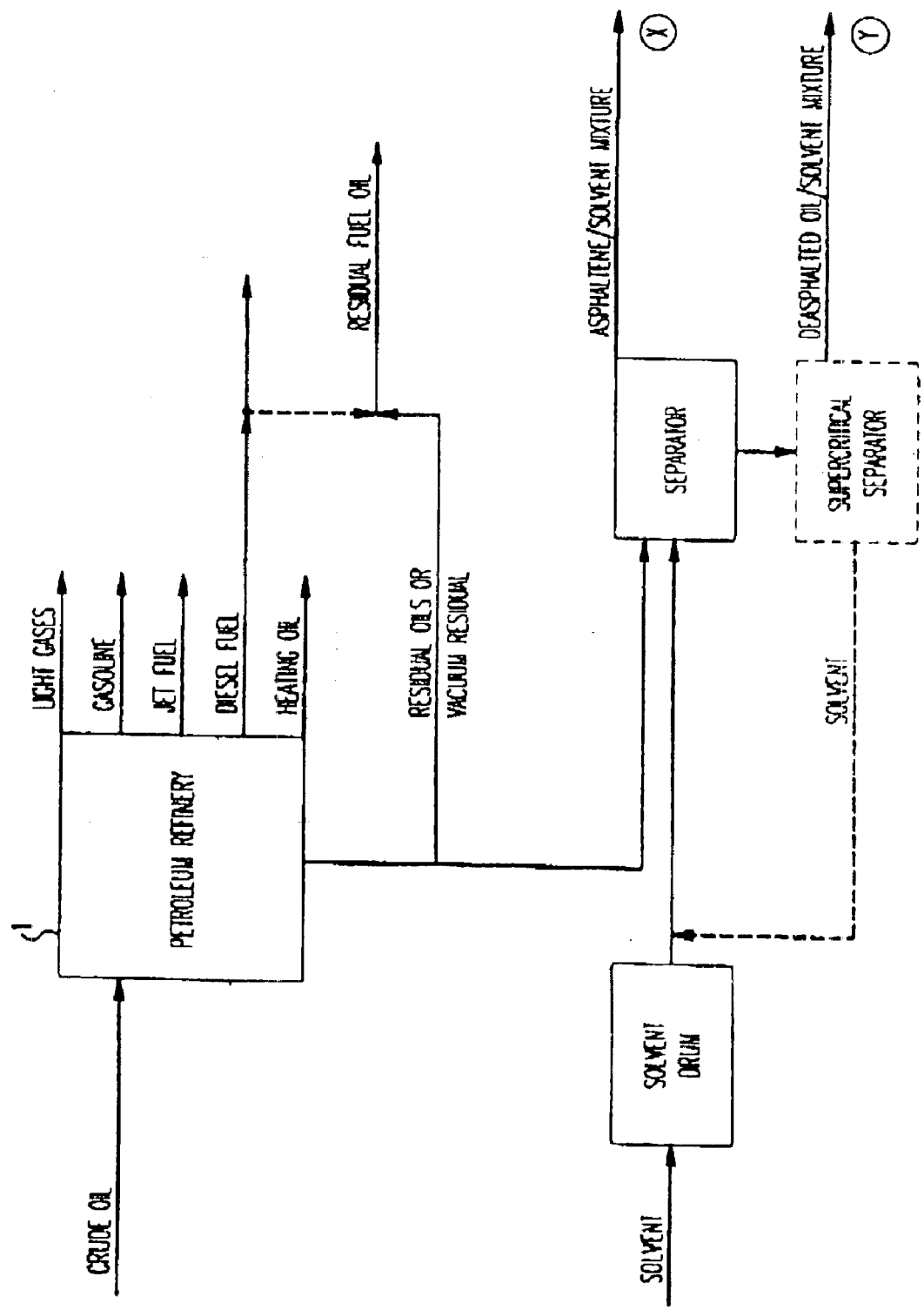
FIG. 1A is a block diagram of an oil refinery designed to produce, from the residual oil, an asphaltene/solvent stream and a deasphalted oil/solvent stream.

Referring now to FIG. 1A, reference numeral 1 designates a typical petroleum refinery that receives crude oil and primarily produces gasoline, jet fuel, diesel fuel, and heating oil. Light gases, which are a by-product of the refinery process are typically sold, or used outside the refinery as fuel. Heavy, viscous residual oil, sometimes referred to as vacuum residual, are also by-products, and are typically converted to residual fuel and sold to electric utilities by blending with diesel fuel to reduce viscosity. The broken lines connecting the diesel fuel output of the refinery to the residual oil output indicate this blending process.

An alternative way to dispose of the residual oil is to utilize a solvent deasphalting unit which involves mixing the residual oil with a light hydrocarbon solvent in a separator to form a mixture that separates into a product stream of asphaltene/solvent and a product stream of deasphalted oil/solvent. The solvent deasphalting unit includes a solvent recovery section that is effective to remove substantially all of the solvent from the product streams, thus recovering the solvent which is returned to the deasphalting unit.

The solvent recovery unit may utilize a supercritical solvent recovery process to remove a great deal of solvent from the DAO product streams the balance of the solvent being removed by an evaporative solvent recovery process operating on the heavy and any intermediate product streams and the DAO product stream produced by the supercritical solvent recovery process. If supercritical solvent recovery were not used as the primary means to recover solvent from the DAO, an evaporative solvent recovery process would operate on all of the product streams.

Figure 1B:
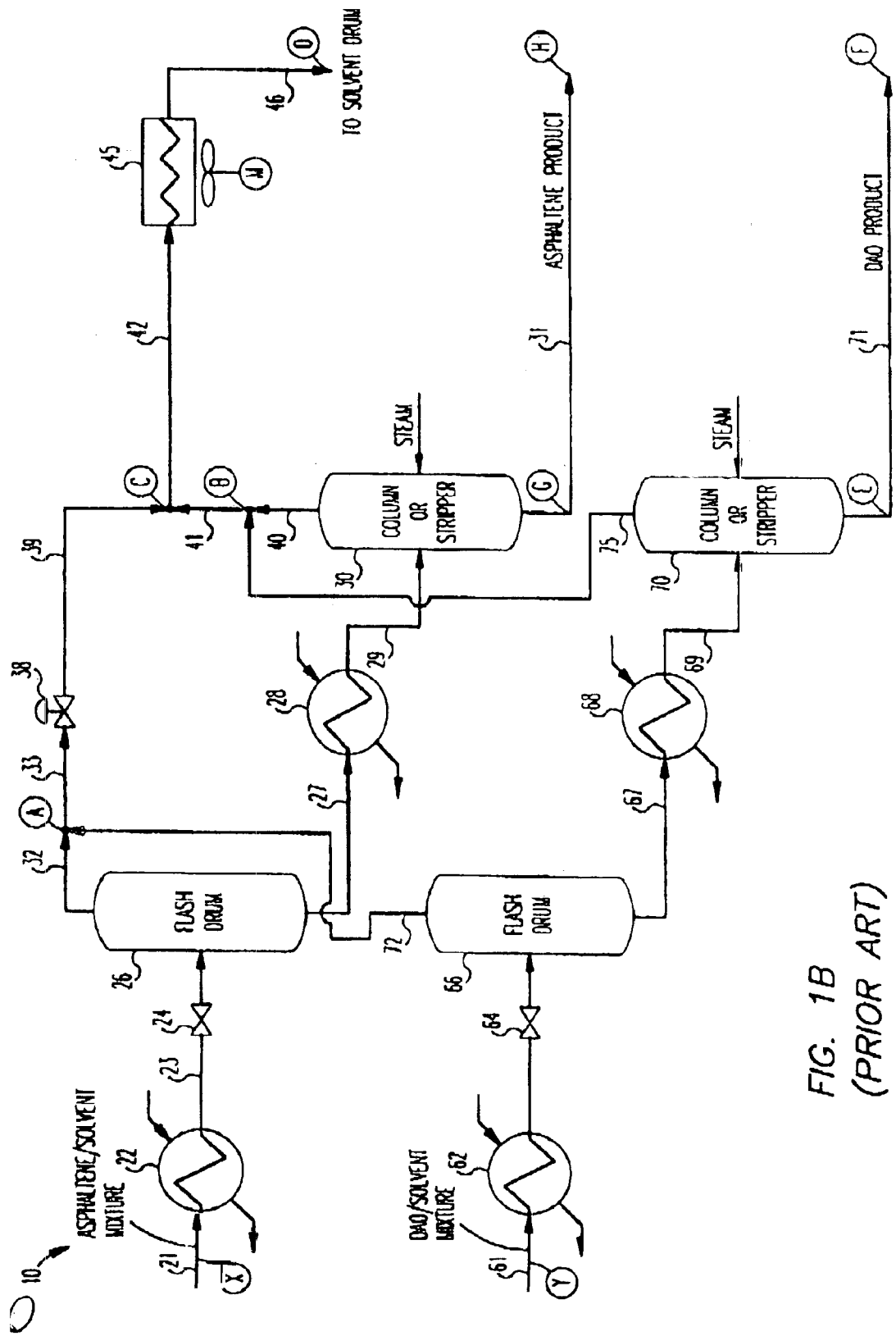
FIG. 1B is a block diagram of a conventional evaporative solvent recovery section of a solvent deasphalting unit which receives an asphaltene/solvent stream and a deasphalted oil/solvent stream and recovers the solvent, and produces product in the form of asphaltene, and deasphalted oil.

An evaporative solvent recovery process, which operates on the streams produced as described above conventionally, is shown by reference numeral 10 in FIG. 1B, and is applicable to solvent recovery systems using supercritical and subcritical solvent recovery, or only subcritical solvent recovery. Such process recovers the solvent so that it can be used again, and produces a product stream of asphaltene, and a product stream of DAO. The DAO fraction is recycled back to the refinery for conversion to gasoline, jet fuel, diesel fuel, and heating oil. The asphaltene fraction may be blended with a lighter, lower viscosity diluent such as diesel fuel, and converted to residual oil for sale to utilities, or in some cases, sold as solid fuel. For light solvent deasphalting units such as propane, where residual solvent is recovered below the pressure of the solvent drum, the vaporized solvent from the strippers has to be repressurized to the pressure of the solvent drum before being condensed.

Figure 2:
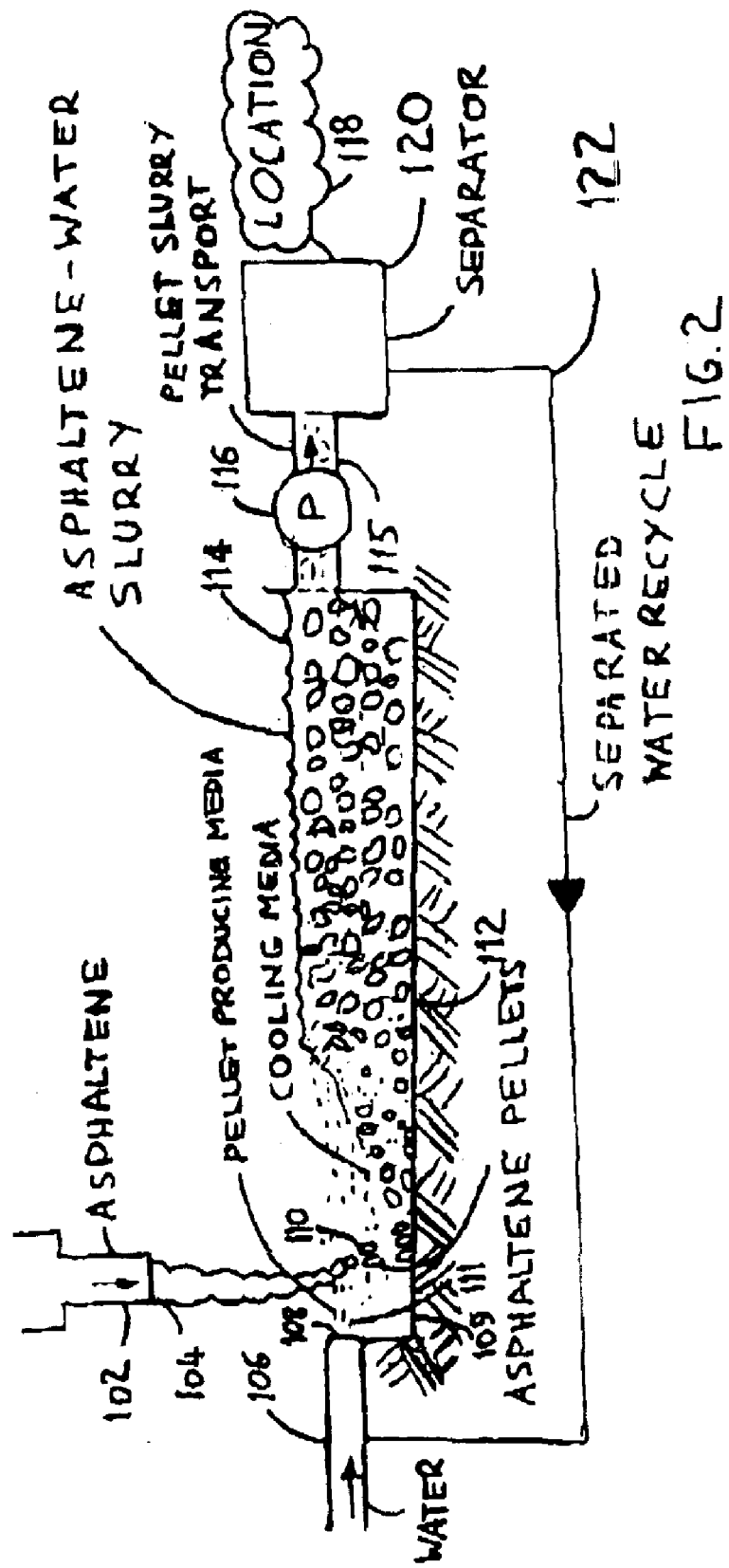
FIG. 2 is a block diagram of an embodiment of the present invention for processing a hydrocarbon feed.

Numeral 100 in FIG. 2 designates an embodiment of apparatus for processing heavy hydrocarbons in accordance with the present invention wherein heavy hydrocarbon or asphaltene feed is conveyed via conduit 102. E.g. heavy hydrocarbon or asphaltene feed can be supplied in line 31 with or without the use of a pump coming from the final asphaltene separation vessel. Often, the asphaltene product in line 31 can be quite hot (sometimes as high as about 450° F.). As the heavy hydrocarbon or asphaltene exits outlet 104 of conduit 102, it meets a pellet producing means or pellet producing media, e.g. gas, liquid, or mechanical device. When a liquid is used the pellet producing media exits conduit 106 via outlet 108. When a gas or mechanical device is used for producing pellets, a cooling and transporting liquid can be added via e.g. conduit 106. The pellet producing means or pellet producing media breaks up the heavy hydrocarbon or asphaltene liquid stream and the heavy hydrocarbon or asphaltene solidifies into pellets 110 as its cools. Reduction in pellet or solid particle size can be achieved by controlling the shear forces induced by the liquid exiting conduit 106 via use of an appropriate flow rate or flow channel geometry. Pellets 110 thus produced together with fluid 111 produce slurry 114. Slurry 114 can flow in a channel or collect in reservoir or container 112 containing some or substantially all of liquid exiting outlet 108 of conduit 106. Bottom 109 of reservoir or container 112 is preferably inclined to ensure the flow of slurry 114 in the direction from the end of reservoir or container 112 adjacent outlet 108 of conduit 106 to the end of reservoir or container 112 near pump 116. The resulting heavy hydrocarbon or asphaltene—fluid slurry is then supplied to conduit 115 using pump 116. Pump 116 can be selected to provide additional size reduction (crushing) or such additional size reduction means can be added separately. In such a manner, the heavy hydrocarbon or asphaltene pellets or solid particles present in conduit 115 are transported to location 118. At location 118, the heavy hydrocarbon or asphaltene—fluid slurry can be treated by removing the fluid from the asphaltene e.g. separating the fluid by using separator 120, so that the heavy hydrocarbon or asphaltene is prepared for use or storage. The separated fluid can be recycled to conduit 106 via conduit 122. If required, a fines separation and remelting element can be added immediately before location 118 or as part of separator 120.

Preferably, the present invention is carried out in a controlled environment or surroundings or even more preferably in an enclosure.

In accordance with the present invention, the pellet producing media and transporting fluid is fluid in which the heavy hydrocarbon or asphaltene does not dissolve therein. For use with heavy hydrocarbons or asphaltene, water is particularly suitable and is the preferred pellet producing media as well as the preferred transporting fluid.

In addition, when, according to the present invention, the pellet producing media is gas, then high velocity air or an other inert gas can be used, Moreover, when, according to the present invention, a pellet producing means is used, e.g. a mechanical device such as a rotating disc, blade(s) or ribbon(s) can be used. When such mechanical devices are used, the use of a cooling or transportation medium is very important.

Additionally, in accordance with the present invention, pellet producing can be carried out by pellet producing means or pellet producing medium either before or after contact with the cooling medium and the commencement of solidification. Thus, in accordance with the present invention, the fluid can meet the heavy hydrocarbon or asphaltene such that a jet of fluid, e.g. a water jet meets the heavy hydrocarbon or asphaltene prior to the pellets falling into reservoir 112. Alternatively, the fluid can meet the heavy hydrocarbon or asphaltene in a reservoir of fluid, e.g. such that the heavy hydrocarbon or asphaltene falls into the reservoir of fluid e.g. water in container 112. In such a case, the jet of water meets the asphaltene below the surface of the slurry 114 present in reservoir or container 112.

Moreover, rather than transporting the heavy hydrocarbon or asphaltene—fluid slurry on line, the heavy hydrocarbon or asphaltene slurry may first of all be stored before it is transported to the required location.

Also, while heavy hydrocarbon or asphaltene is mentioned in this specification as material from which pellets can be produced in accordance with the present invention, other materials, e.g. vacuum residue, etc. can be considered as material from which pellets can be produced in accordance with the present invention.

In addition, it should be noted that supply means or lines mentioned in this specification refer to suitable conduits, etc.

Moreover, it should be pointed out that while this specification presents FIGS. 1A and 1B as apparatus and a method for producing asphaltenes, pellets can be produced in accordance with the present invention from asphaltene produced in any other method and by any other means.

Additionally, while the term asphaltene is used throughout the specification, the term asphaltene is taken to include in its meaning asphalt like materials that are predominately pentane insoluble.

Furthermore, it should be pointed out that the present invention includes as well the method for operating the apparatus disclosed with reference to above-described figures.

It is believed that the advantages and improved results furnished by the method and apparatus of the present invention are apparent from the foregoing description of the invention. Various changes and modifications may be made without departing from the spirit and scope of the invention as described in the claims that follow.

What is claimed is:

1. Apparatus for producing asphaltene pellets comprising:
   a) flow means that supplies hot asphaltene through a conduit to its outlet;
   b) pellet producing means that breaks up the liquid stream of said hot asphaltene exiting the outlet of said conduit and produces pellets of asphaltene;
   c) a reservoir or container that collects said pellets of asphaltene together with some fluid producing a slurry; and
   d) transporting means that transports said slurry to the required location.

2. Apparatus according to claim 1 wherein said pellet producing means comprises means for spraying a liquid towards the asphaltene exiting said outlet of the conduit whereby said asphaltene is cooled and pellets of asphaltene are produced.

3. Apparatus for producing asphaltene pellets comprising:
   a) flow means that supplies hot asphaltene through a conduit to its outlet;
   b) pellet producing means that breaks up the liquid stream of said hot asphaltene exiting the outlet of said conduit and produces pellets of asphaltene;
   c) a reservoir or container that collects said pellets of asphaltene together with some fluid producing a slurry;
   d) transporting means that transports said slurry to the required location; and
   wherein said pellet producing medium is water.

4. Apparatus according to claim 3 wherein said transporting means includes a conduit that supplies the slurry to the required location.

5. Apparatus according to claim 3 including a pump for pumping the slurry to said location.

6. Apparatus according to claim 3 wherein said pellet producing means includes spray means for spraying liquid water so that the liquid water contacts the asphaltene and breaks up the liquid stream of said hot asphaltene exiting said outlet of said conduit and produces pellets of asphaltene.

7. A method for producing asphaltene pellets comprising the steps of:
   a) supplying hot asphaltene through a conduit to its outlet;
   b) breaking up the liquid stream of said hot asphaltene exiting the outlet of said conduit using a pellet producing medium to produce pellets of asphaltene;
   c) collecting said pellets of asphaltene in a reservoir together with some fluid producing a slurry; and
   d) transporting said slurry to a required location.

8. A method according to claim 7 including grinding said asphaltene pellets and transporting the grinded asphaltene pellets to a location.

9. A method for producing asphaltene pellets comprising the steps of:
   a) supplying hot asphaltene through a conduit to its outlet;
   b) breaking up the liquid stream of said hot asphaltene exiting the outlet of said conduit using a pellet producing medium to produce pellets of asphaltene;
   c) collecting said pellets of asphaltene in a reservoir together with some fluid producing a slurry; and
   d) transporting said slurry to a required location; wherein said step of breaking up the liquid stream of hot asphaltene flowing out of the outlet of said conduit using a pellet producing medium so that pellets of asphaltene are produced is carried out by spraying a fluid so that the fluid contacts the asphaltene exiting said outlet of the conduit and pellets of asphaltene are produced.

10. A method according to claim 9 wherein the step of spraying a fluid so that the fluid contacts the asphaltene exiting said outlet of the conduit and pellets of asphaltene are produced is carried out by spraying liquid water.

11. A method according to claim 9 including pumping the slurry to said location;
    and wherein the step of collecting said pellets of asphaltene in a reservoir together with some fluid producing a slurry is carried out by collecting said pellets of asphaltene in a reservoir together with some liquid water producing a heavy hydrocarbon or asphaltene-water slurry;
    and wherein the step of transporting said slurry to a required location is carried out by supplying said slurry via a conduit to a required location.

* * * * *